(12) United States Patent
Shao et al.

(10) Patent No.: US 11,870,937 B2
(45) Date of Patent: Jan. 9, 2024

(54) METHODS FOR SMART GAS CALL CENTER FEEDBACK MANAGEMENT AND INTERNET OF THINGS (IOT) SYSTEMS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/301,250

(22) Filed: Apr. 16, 2023

(65) Prior Publication Data
US 2023/0254409 A1    Aug. 10, 2023

(30) Foreign Application Priority Data
Mar. 9, 2023    (CN) .......................... 202310220626.2

(51) Int. Cl.
*H04M 3/523*    (2006.01)
*G06Q 50/06*    (2012.01)
*H04M 3/22*    (2006.01)

(52) U.S. Cl.
CPC .......... *H04M 3/5233* (2013.01); *G06Q 50/06* (2013.01); *H04M 3/2218* (2013.01); *H04M 2203/408* (2013.01)

(58) Field of Classification Search
None
See application file for complete search history.

(56) References Cited

U.S. PATENT DOCUMENTS

| 2006/0025995 A1* | 2/2006 | Erhart ................. G10L 15/1822 704/239 |
| 2017/0068976 A1 | 3/2017 | Wawrzynowicz |

(Continued)

FOREIGN PATENT DOCUMENTS

| CN | 103905659 A | 7/2014 |
| CN | 109873909 A | 6/2019 |

(Continued)

OTHER PUBLICATIONS

Notification to Grant Patent Right for Invention in Chinese Application No. 202310220626.2 dated Apr. 23, 2023, 6 pages.

(Continued)

*Primary Examiner* — Nafiz E Hoque
(74) *Attorney, Agent, or Firm* — METIS IP LLC

(57) ABSTRACT

The embodiment of the present disclosure provides a method for smart gas call center feedback management and an Internet of things (IoT) system thereof. The method is implemented based on a smart gas management platform. The method includes: receiving a call message of a target customer through a call center, and a content of the call message being related to a gas business; determining a feedback mode by analyzing the call message through the call center; in response to the feedback mode being manual feedback, determining a target operator through the call center to feed back a call of the target customer; and in response to the feedback mode being automatic feedback, determining a feedback content through the call center and sending the feedback content to the target customer.

8 Claims, 6 Drawing Sheets

(56) References Cited

U.S. PATENT DOCUMENTS

2020/0193353 A1\* 6/2020 Weisman ......... G06Q 10/06393
2022/0398598 A1\* 12/2022 Das ........................ G06F 40/35

FOREIGN PATENT DOCUMENTS

| CN | 110298682 A | 10/2019 |
| CN | 110491374 A | 11/2019 |
| CN | 110633419 A | 12/2019 |
| CN | 111163237 A | 5/2020 |
| CN | 111667316 A | 9/2020 |
| CN | 113157925 A | 7/2021 |
| CN | 113283915 A | 8/2021 |
| CN | 113438374 A | 9/2021 |

OTHER PUBLICATIONS

First Office Action in Chinese Application No. 202310220626.2 dated Apr. 5, 2023, 18 pages.

\* cited by examiner

METHODS FOR SMART GAS CALL CENTER FEEDBACK MANAGEMENT AND INTERNET OF THINGS (IOT) SYSTEMS THEREOF

CROSS-REFERENCE TO RELATED APPLICATION

This application claims priority of Chinese Patent Application No. 202310220626.2, filed on Mar. 9, 2023, the contents of which are hereby incorporated by reference to its entirety.

TECHNICAL FIELD

The present disclosure relates to the field of a system for gas management, in particular, to a method for smart gas call center feedback management and an Internet of things system.

BACKGROUND

In a system for smart gas call center feedback management of a gas industry, after the call center receives a call from a customer, an operator who answers the call usually responds directly according to a content of the call, or a robot directly answers and replies. For example, a system for call center service management with an authorized announcement number CN111211922B discloses a response processing process including connecting an external call to a manual response processing module through a robot response module, processing call information of a user by the manual response module, or distinguishing a category of the call information and transferring the call information to a corresponding business category processing module by the manual response module for follow-up information processing. This process involves serial processing from the robot to the manual, causing a low feedback efficiency. Meanwhile, a feedback ability of the robot to the call is limited, and the processing, classification, and transfer of the call information still need to be executed manually. As a result, a customer problem may not be quickly solved. Therefore, an improved method for call center feedback management is needed to improve the feedback efficiency of the call center and the ability to meet call needs of the customer.

SUMMARY

One or more embodiments of the present disclosure provide a method for smart gas call center feedback management, which is implemented based on a smart gas management platform. The method includes: receiving a call message of the target customer through a call center, and a content of the call message being related to a gas business; analyzing the call message through the call center and determining a feedback mode; determining a feedback mode by analyzing the call message through the call center; in response to the feedback mode being manual feedback, determining a target operator through the call center to feed back a call of the target customer; and in response to the feedback mode being automatic feedback, determining a feedback content through the call center and sending the feedback content to the target customer.

One or more embodiments of the present disclosure provide an Internet of things (IoT) system for smart gas call center feedback management. A smart gas management platform of the IoT system is configured to: receive a call message of a target customer through a call center, and a content of the call message being related to a gas business; determine a feedback mode by analyzing the call message through the call center; in response to the feedback mode being manual feedback, determine a target operator through the call center to feedback a call of the target customer; and in response to the feedback mode being automatic feedback, determine a feedback content through the call center and send the feedback content to the target customer.

One or more embodiments of the present disclosure provide a non-transitory computer-readable storage medium storing computer instructions, and when reading the computer instructions in the storage medium, a computer implements the method for smart gas call center feedback management.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
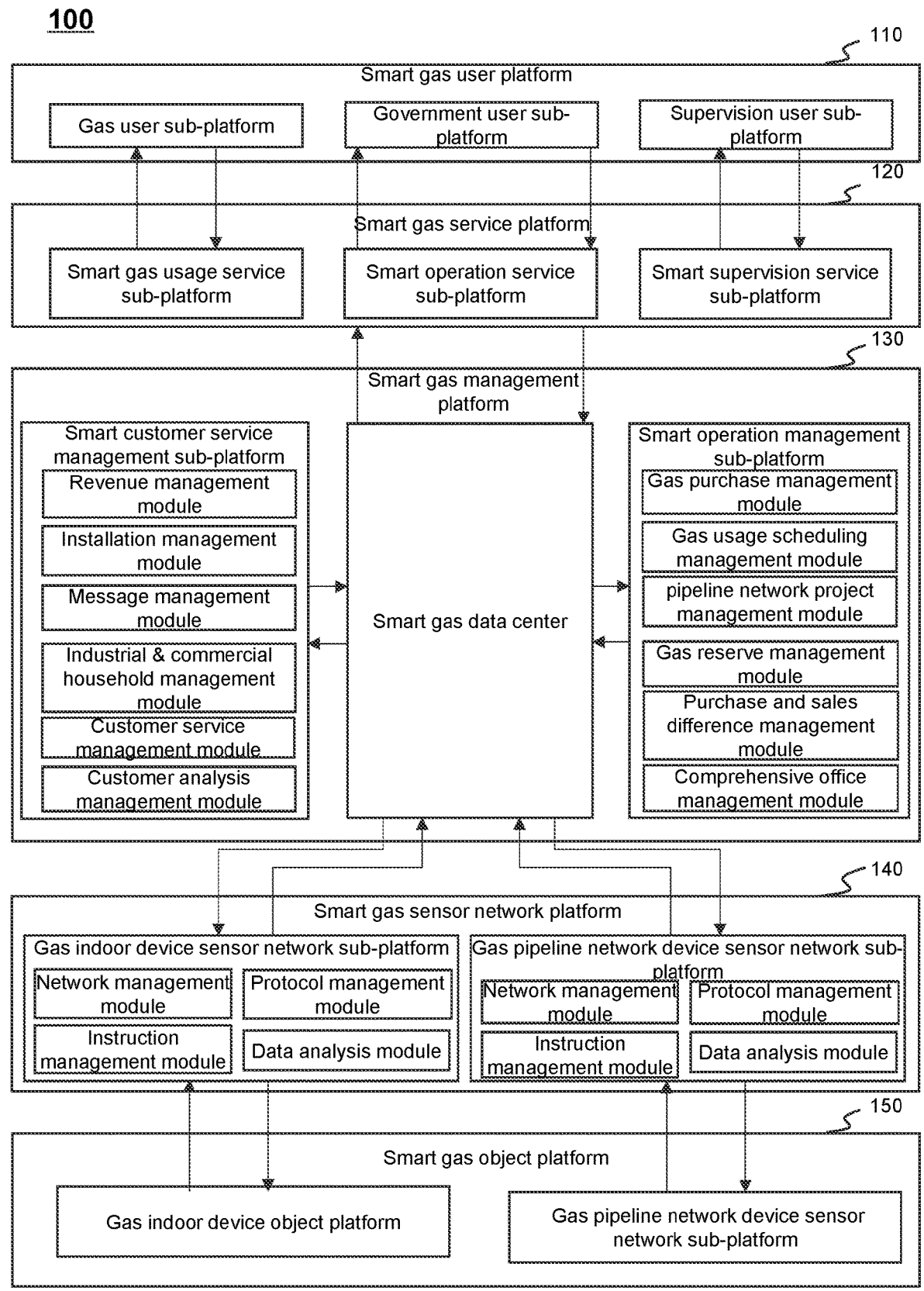
FIG. 1 is a schematic diagram illustrating an exemplary Internet of Things (IoT) system for smart gas call center feedback management according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "an", "one", and/or "the" is not specifically singular form, and the plural form may be included. It will be further understood that the terms "comprise," "comprises," "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an exemplary Internet of Things (IoT) system for smart gas call center feedback management according to some embodiments of the present disclosure.

As shown in FIG. 1, in some embodiments, an IoT system 100 for smart gas call center feedback management may include a smart gas user platform 110, a smart gas service platform 120, a smart gas management platform 130, a smart gas sensor network platform 140, and a smart gas object platform 150.

In some embodiments, the processing of information in the IoT may be divided into a processing process of perception information and a processing process of control information, and the control information may be information generated based on the perception information. The processing process of the perceptual information includes: obtaining the perceptual information by the smart gas object platform 150 and sending the perceptual information to the smart gas user platform 110 for a user to obtain through the smart gas sensor network platform 140, the smart gas management platform 130, and the smart gas service platform 120. The control information is generated by the user through the smart gas user platform 110, and then the control information is sent to the smart gas object platform 150 through the smart gas service platform 120, the smart gas management platform 130, and the smart gas sensor network platform 140 to control the smart gas object platform 150 to complete a corresponding control instruction.

The smart gas user platform 110 may be a platform for interacting with the user. In some embodiments, the smart gas user platform 110 may be configured as a terminal device, for example, the terminal device may include a mobile device, a tablet computer, or the like, or any combination thereof. In some embodiments, the smart gas user platform 110 may be configured to feed back gas service-related information to the user. In some embodiments, the smart gas user platform 110 is provided with a gas user sub-platform, a government user sub-platform, and a supervision user sub-platform. In some embodiments, the smart gas user platform 110 may perform a two-way interaction with the smart gas service platform 120, issue gas user feedback information to a smart gas usage service sub-platform, and receive customer service feedback information uploaded by the smart gas usage service sub-platform.

The gas user sub-platform is oriented to a gas user, providing information on gas usage data, a solution to a gas problem, etc. The gas user refers to a user who uses the gas. In some embodiments, the gas user sub-platform may correspond to and interact with the smart gas usage service sub-platform to obtain a service for safe gas usage.

The government user sub-platform is oriented to a government user and provides information on gas operation-related data. The government user refers to a user of a government department related to a gas operation. In some embodiments, the government user sub-platform may correspond to and interact with a smart operation service sub-platform to obtain a service for the gas operation.

The supervision user sub-platform supervises an operation of an entire IoT system for emergency handling of a gas call center and is oriented to a supervision user. The supervision user refers to a user of a safety department. In some embodiments, the supervision user sub-platform may correspond to and interact with a smart supervision service sub-platform to obtain a service required by safety supervision.

The smart gas service platform 120 may be a platform for receiving and transmitting data and/or information. For example, the smart gas service platform 120 may receive gas user feedback information issued by the gas user sub-platform, and send the customer service feedback information to the gas user sub-platform. In some embodiments, the smart gas service platform 120 is provided with the smart gas usage service sub-platform, the smart operation service sub-platform, and the smart supervision service sub-platform. In some embodiments, the smart gas service platform 120 may interact downwardly with the smart gas management platform 130. For example, the smart gas service platform 120 may send the gas user feedback information to the smart gas management platform, and receive the customer service feedback information uploaded by the smart gas management platform.

The smart gas usage service sub-platform is configured to provide the gas user with information about the gas service. The smart gas usage service sub-platform corresponds to the gas user sub-platform.

The smart operation service sub-platform is configured to provide the government user with information related to the gas operation. The smart operation service sub-platform corresponds to the government user sub-platform.

The smart supervision service sub-platform is configured to provide the supervision user with the information related to the safety supervision. The smart supervision service sub-platform corresponds to the supervision user sub-platform.

The smart gas management platform 130 refers to a platform for overall planning and coordinating connections and cooperation among various functional platforms, gathering all information of the IoT system, and providing functions of perceptual management and control management for the IoT operation system. For example, the smart gas management platform 130 may obtain a gas device-related data instruction, gas device-related data, etc.

In some embodiments, the smart gas management platform 130 is disposed with a smart customer service management sub-platform, a smart operation management sub-platform, and a smart gas data center, and each management sub-platform may interact with the smart gas data center in two-way, and the smart gas data center summarizes and stores all operation data of the IoT system, and each management sub-platform may obtain data from the smart gas data center and feedback relevant operation information. In some embodiments, the smart operation management sub-platform and the smart service management sub-platform may exchange information with the smart gas service platform 120 and the smart gas sensor network platform 140 through the smart gas data center. In some embodiments, the smart gas management platform 130 may issue an instruction to obtain the gas device-related data to the smart gas sensor network platform 140 and receive the gas device-related data uploaded by the smart gas sensor network platform 140. In some embodiments, the smart gas management platform 130 may receive the gas user feedback information issued by the smart gas service platform 120, and upload the customer service feedback information to the smart gas service platform 120.

In some embodiments, the smart customer service management sub-platform interacts in two-way with the smart gas data center, and the smart customer service management sub-platform obtains the gas user feedback information and the gas device-related data from the smart gas data center for analysis and processing. In some embodiments, the smart customer service management sub-platform of the smart gas management platform is disposed with a revenue management module, an industrial and commercial household management module, an installation management module, a customer service management module, a message management module, and a customer analysis management module.

The message management module may check the call, consultation, feedback, complaint, and other information of the customer, and may respond to the customer service management module accordingly.

The customer service management module may connect to a corresponding customer service, analyze and reply on the information fed back by the customer.

The installation management module may receive gas installation information of the user.

The revenue management module may be configured to process and manage revenue information based on revenue-related data and according to a preset algorithm.

The industrial and commercial household management module may be configured to process data related to industrial and commercial households, and perform data storage and management.

The customer analysis management module may be configured to analyze information related to a gas user, as well as query and analyze business information related to the government and the supervision department.

In some embodiments, the smart operation management sub-platform of the smart gas management platform is disposed with a gas purchase management module, a gas reserve management module, a gas usage scheduling management module, a purchase and sales difference management module, a pipeline network project management module, and a comprehensive office management module. The pipeline network project management module may check work order information, a staffing, a progress, etc., of the pipeline network project and manage the pipeline network project.

In some embodiments, the smart gas data center may receive the gas user feedback information issued by the smart gas usage service sub-platform. In some embodiments, the smart gas data center may issue the instruction to obtain the gas device-related data to the smart gas sensor network platform 140, receive the gas device-related data (e.g., gas (indoor/pipeline network) device operation information, etc.) uploaded by the smart gas sensor network platform 140, and send the gas user feedback information and the gas device-related data to the smart customer service management sub-platform for analysis and processing. The gas device-related data may include: gas usage information in different time periods and areas. In some embodiments, the smart operation management sub-platform may send processed maintenance management information to the smart gas data center, and the smart gas data center may send summarized and processed maintenance management information to the smart gas service platform 120.

The smart gas sensor network platform 140 may be a functional platform for managing sensor communication. The smart gas sensor network platform 140 may be configured as a communication network and gateway to realize functions such as network management, protocol management, instruction management, and data analysis. In some embodiments, the smart gas sensor network platform 140 may include an gas indoor device sensor network sub-platform and a gas pipeline network device sensor network sub-platform. In some embodiments, the smart gas sensor network platform 140 may be connected to the smart gas management platform 130 and the smart gas object platform 150 to realize the functions of perceptual information sensor communication and control information sensor communication. For example, the smart gas sensor network platform 140 may receive the instruction to obtain the gas device-related data issued by the smart gas data center, and issue the instruction to obtain the gas device-related data to the smart gas object platform 150, and may further receive the gas device-related data uploaded by the smart gas object platform 150, and upload the data to the smart gas data center.

The gas indoor device sensor network sub-platform corresponds to a gas indoor device object sub-platform, which is configured to obtain relevant data of an indoor device.

The gas pipeline network device sensor network sub-platform corresponds to a gas pipeline network device object sub-platform, which is configured to obtain the relevant data of the pipeline network device.

The smart gas object platform 150 may be a functional platform for generating the perceptual information and executing the controlling information, and may include the gas device and other device. The gas device may include an indoor device and a pipeline network device. The other device may include a monitoring device, such as a temperature sensor, a pressure sensor, etc. In some embodiments, the smart gas object platform 150 may further be disposed with an gas indoor device object sub-platform and a gas pipeline network device object sub-platform. The gas indoor device object sub-platform may include an indoor device, for example, a gas metering device of the gas user, etc. The gas pipeline network device object sub-platform may include a pipeline network device, such as a pressure regulating device, a gas gate station compressor, a gas flow meter, a valve control device, a thermometer, a barometers, etc. In some embodiments, the smart gas object platform 150 may interact upwardly with the smart gas sensor network platform 140, receive the instruction to obtain the gas device-related data issued by the smart gas sensor network platform 140, and upload the gas device-related data to the corresponding sensor network sub-platform.

The gas indoor device object sub-platform corresponds to the gas indoor device sensor network sub-platform, and the relevant data of the indoor device is uploaded to the smart gas data center through the gas indoor device sensor network sub-platform.

The gas pipeline network device object sub-platform corresponds to the gas pipeline network device sensor network sub-platform, and the relevant data of the gas pipeline network device is uploaded to the smart gas data center through the gas pipeline network device sensor network sub-platform.

In some embodiments of the present disclosure, through the above five-platform IoT functional system structure, the transmission or control of the gas user feedback information, the customer service feedback information, etc., is implemented, and a closed loop of information flow is completed, which makes the IoT information processing smoother and more efficient.

It should be noted that the above description of the IoT system for the smart gas call center feedback management and its platforms is only for convenience of description, and does not limit the present disclosure to the scope of the embodiments cited. It will be understood that for those skilled in the art, after understanding the principle of the IoT system, it is possible to arbitrarily combine various modules, or form subsystems to connect with other modules without departing from this principle. In some embodiments, the smart gas sensor network platform and the smart gas object platform disclosed in FIG. 1 may be different platforms in one IoT system, or may be one platform that implements the functions of the above two or more platforms. For example, each platform may share one storage module, or each platform may have its own storage module. Such deformations are within the protection scope of the present disclosure.

Figure 2:
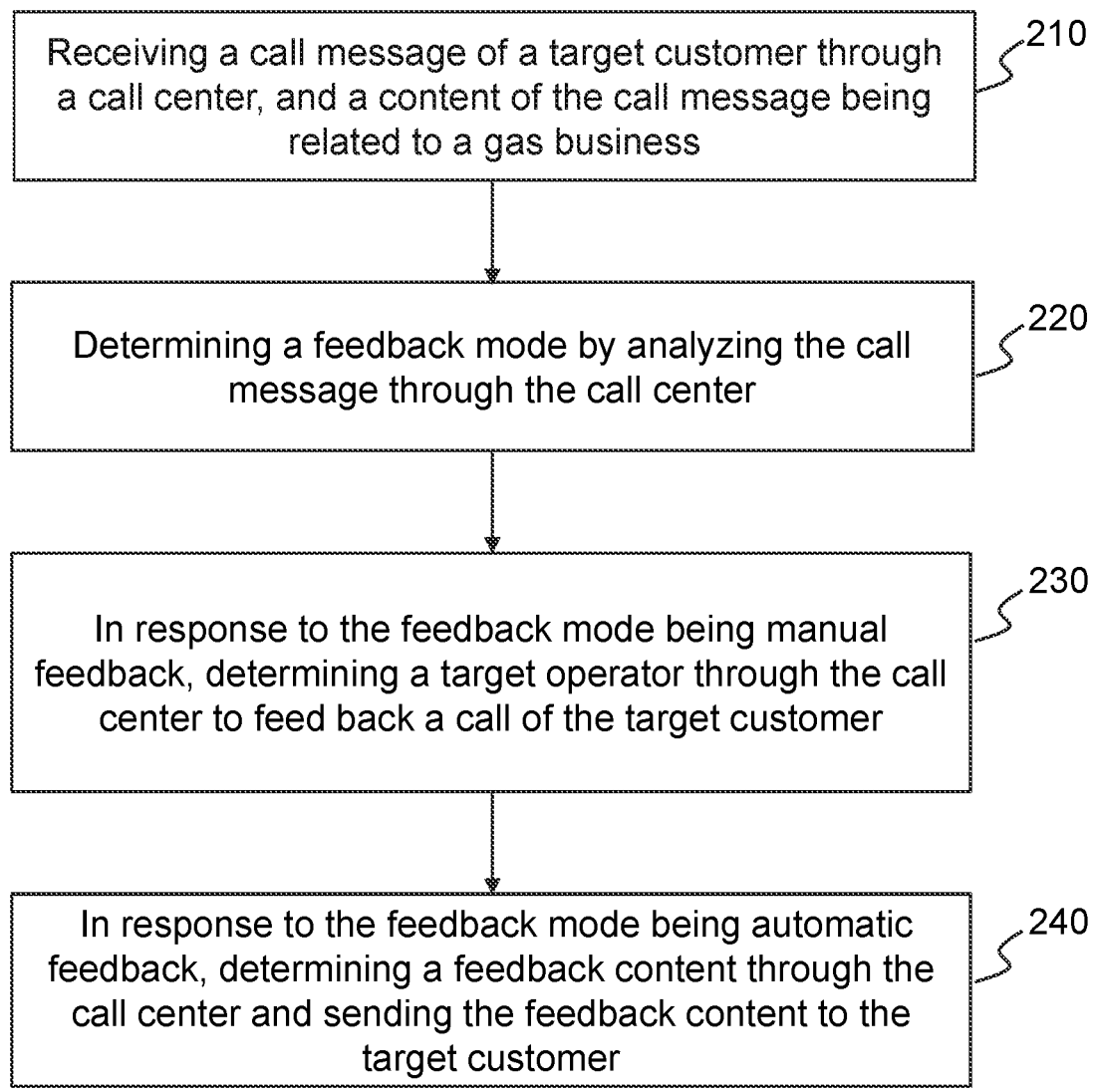
FIG. 2 is a flowchart illustrating an exemplary method for smart gas call center feedback management according to some embodiments of the present disclosure.

FIG. 2 is a schematic flowchart illustrating an exemplary method for gas call center feedback management according to some embodiments of the present disclosure. In some embodiments, process 200 may be executed by the smart gas management platform 130 of the IoT system for the smart gas call center feedback management. As shown in FIG. 2, the process 200 includes the following operations.

In 210, receiving a call message of a target customer through a call center, and a content of the call message being related to a gas business.

The target customer refers to a gas user who initiates the call. For example, the target customer may be a gas user who finds a fault during a gas usage and needs to report for a repair, or a user who needs to open a new account.

The call message refers to a speech record left by the user when accessing the call center. The user may call the call center through various feasible communication devices, such as a wired telephone and a mobile terminal. In some embodiments, the content of the call message is related to the gas business. The gas business refers to a business related to the gas, such as an account opening, a payment, an inquiry, a report for installation, a consultation, a complaint, a report for repair, a business handling and change, an information release, etc. The content of the call message may include one or more types of gas businesses.

The call center refers to a customer service center. The call center may be an interactive answering system with access channels such as a telephone, a short messaging service (SMS), the Internet, an email, social media, or various other means. A gas company may set up the call center based on various feasible modes, and receive the call message from the user. For example, the gas company may set up the call center based on a computer telephony integration (CTI) technology.

In 220, determining a feedback mode by analyzing the call message through the call center.

The feedback mode refers to a mode to give feedback on the call message. For example, the feedback mode may include one or more of a manual feedback, an automatic feedback, or other feedback modes.

In some embodiments, the smart gas management platform may use various feasible modes to analyze the call message through the call center, such as a manual analysis, a machine learning model analysis, etc. An implementation mode of the manual analysis may include: answering the call message by an operator, and recording information in the call message according to a category (such as a time, a location, a call purpose, a service category, etc.).

In some embodiments, the smart gas management platform may determine the feedback mode based on various feasible modes. In some embodiments, the smart gas management platform may determine the feedback mode according to a preset feedback mode determination rule. The preset feedback mode determination rule may include determining the feedback mode according to a relationship between an incoming call volume and an incoming call volume threshold. For example, when the incoming call volume exceeds the incoming call volume threshold, the feedback mode is determined to be the automatic feedback. In some embodiments, the smart gas management platform may determine the feedback mode based on a choice of the user in the call message. For example, when the call message of the user includes "manual", the smart gas management platform may determine that the feedback mode is the manual feedback.

Figure 3:
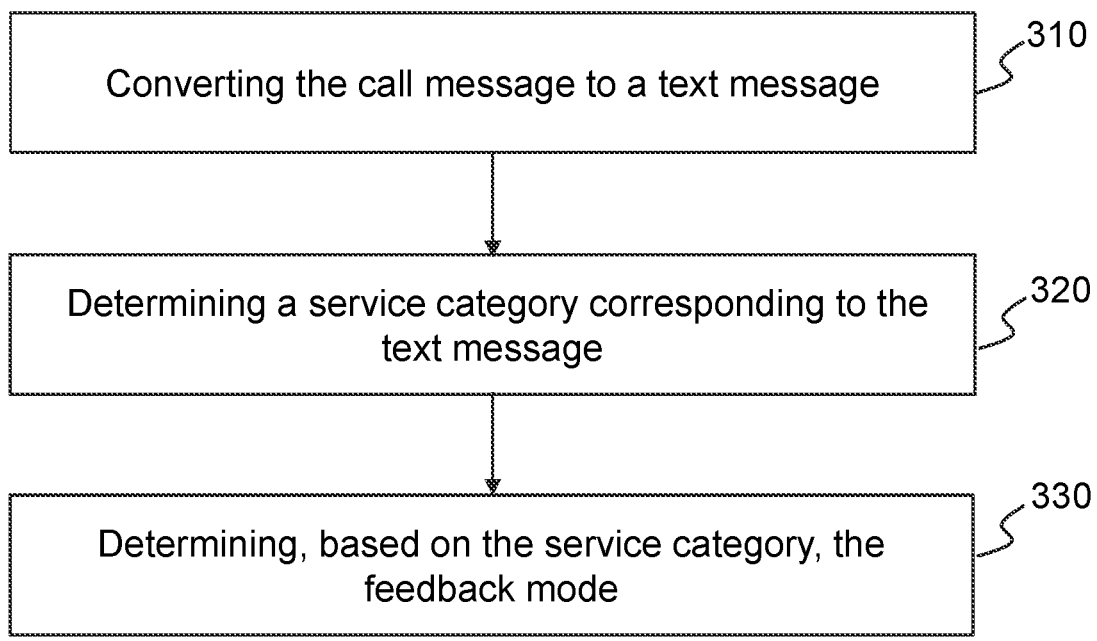
FIG. 3 is a flowchart illustrating an exemplary process for determining a feedback mode according to some embodiments of the present disclosure.

For more content on the mode of determining the feedback mode by analyzing the call message through the call center, please refer to FIG. 3 and its related description.

In 230, in response to the feedback mode being manual feedback, determining a target operator through the call center to feed back a call of the target customer.

The operator is an agent in the call center. For example, the operator may be a person who provides the target customer with a service such as a complaint, suggestion, and consultation as well as an internal resource scheduling through an online call service.

The call center may determine the target operator through various feasible modes. In some embodiments, the call center may determine the target operator according to the free time of the operator. For example, when there are multiple free operators, the call center determines an operator whose current free time is the longest as the target operator. As another example, the call center may determine the target operator according to an experience value of the operator. When there are multiple operators, the call center determines an operator with the highest current experience value as the target operator. The experience value may be related to total work hours of the operator.

Figure 5:
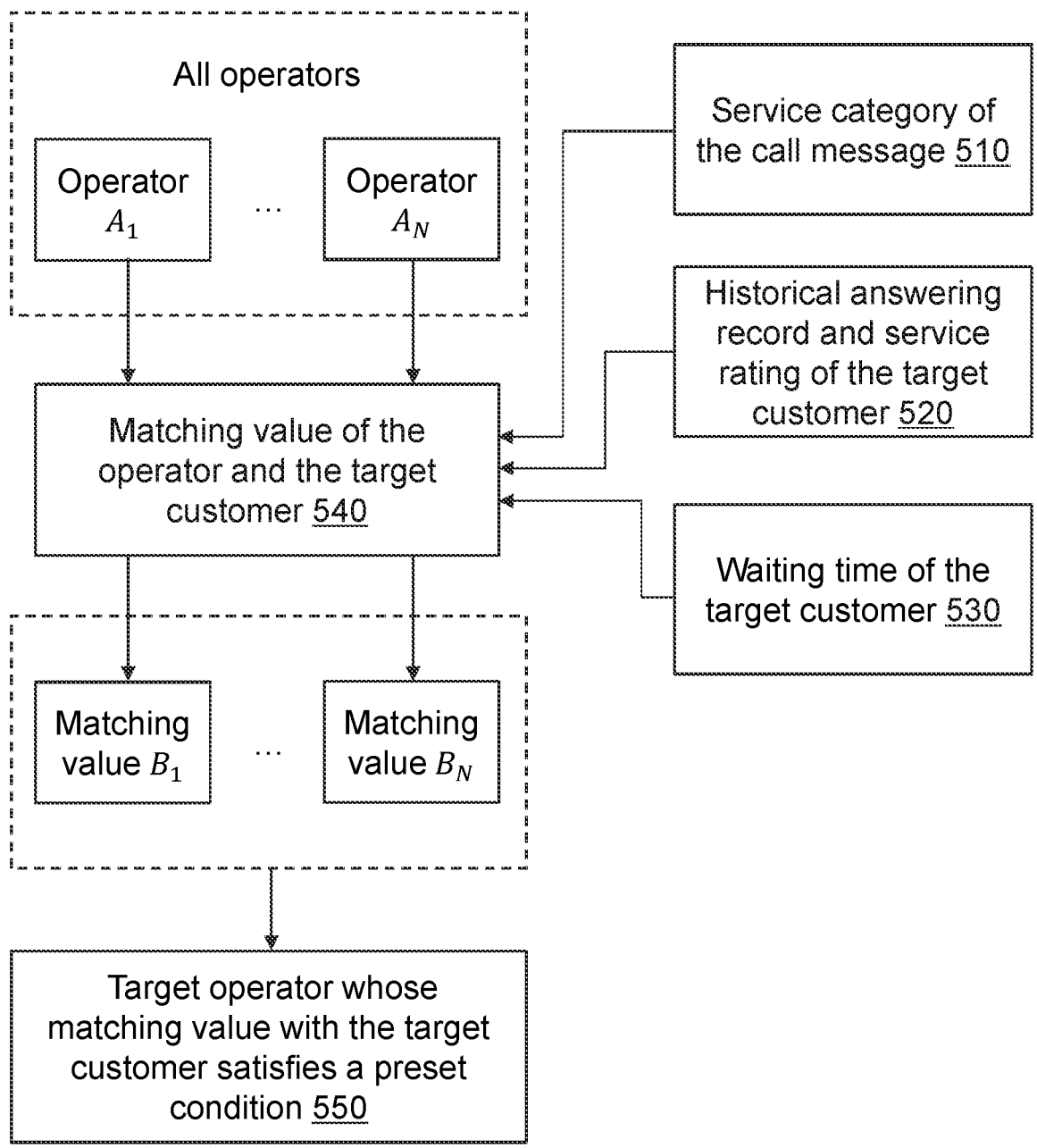
FIG. 5 is a schematic diagram illustrating an exemplary process for determining an operator according to some embodiments of the present disclosure.

For more content about the mode of determining the target operator, please refer to FIG. 5 and its related description.

In 240, in response to the feedback mode being automatic feedback, determining a feedback content through the call center and sending the feedback content to the target customer.

The feedback content refers to the content that is fed back to the customer. The feedback content may be used for reference or selection by the customer according to needs. For example, when the content of the call message is related to the opening of the gas business, the feedback content may include an opening process, an opening procedure, a possible fees, etc. As another example, when the content of the call message is related to a gas business inquiry, the feedback content may include an account number, a usage detail, a balance, a branch, etc.

The call center may determine the feedback content in various possible modes. In some embodiments, the call center may determine a preset feedback content as the feedback content. For example, the preset feedback content may be a feedback content preset in the system and broadcasted to the customer in sequence. As another example, the call center may match the call message with a historical call message in a database and determine the feedback content of the historical call message with a high matching degree as the feedback content.

In some embodiments, the feedback content is determined based on the service category corresponding to the call message.

In some embodiments, the feedback content includes a commonly push content corresponding to the service category. For example, when the service category includes a payment service, the commonly pushed content includes one or more of a payment mode, a frequently asked question about the payment, etc., and the feedback content may include one or more of the payment mode, the frequently asked question about the payment, etc.

Figure 6:
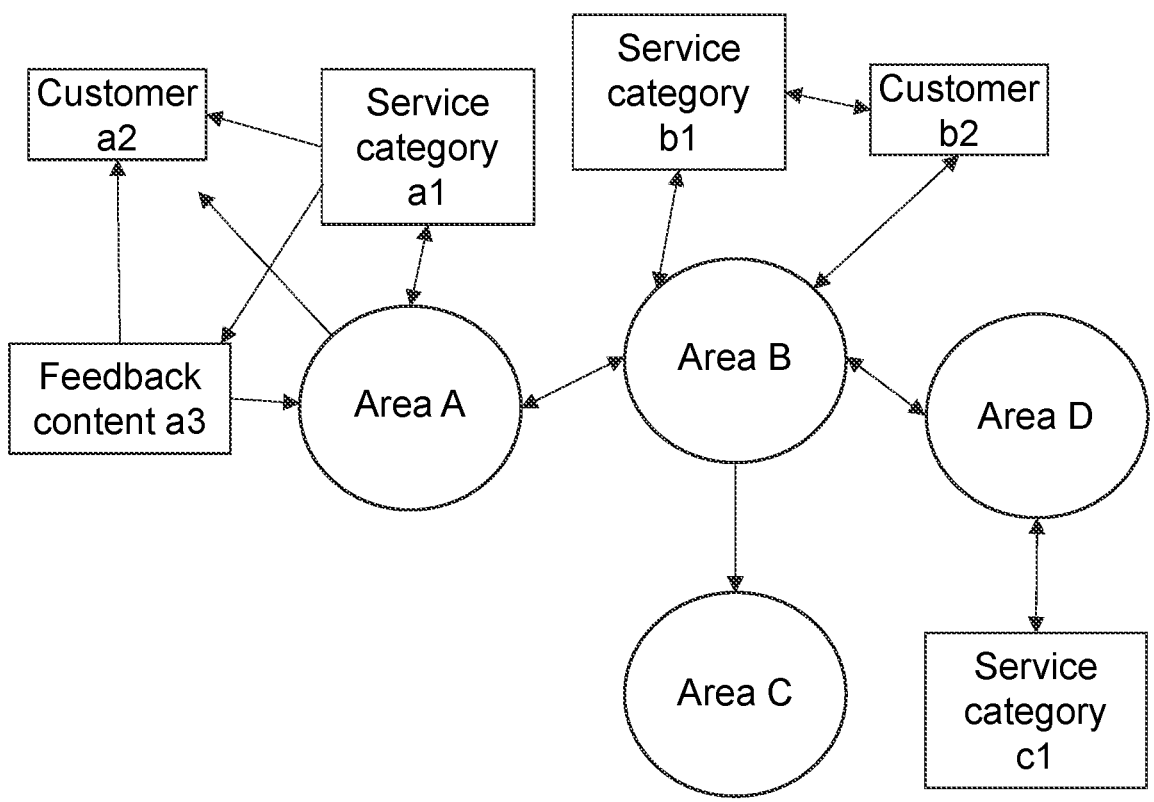
FIG. 6 is a schematic diagram illustrating an exemplary process for determining a feedback content through a knowledge map according to some embodiments of the present disclosure.

For more modes of determining the feedback content based on the service category corresponding to the call message, refer to FIG. 6 and related description thereof.

The call center may send the feedback content to the target customer in various feasible modes. For example, the call center may send the feedback content to the target customer by a speech broadcast. As another example, the call center may send the feedback content to the target customer by a short message.

Through the method for the smart gas call center feedback management described in some embodiments of the present disclosure, the manual feedback and the target operator, or the automatic feedback mode and the feedback content may be determined based on the call message, which can improve the feedback efficiency of the call center and realize personalized feedback.

FIG. 3 is a flowchart illustrating an exemplary process for determining a feedback mode according to some embodiments of the present disclosure. As shown in FIG. 3, process 300 includes the following operations. In some embodiments, the process 300 may be performed by the smart gas management platform 130.

In 310, converting the call message to a text message.

The smart gas management platform 130 may convert the call message to the text message in various feasible modes, such as a text detection technology. In some embodiments, the smart gas management platform 130 may convert the call message into a text message through a speech recognition technology.

The speech recognition technology, also known as automatic speech recognition (ASR), computer speech recognition (CSR), or speech to text (STT), is used to convert a human speech content to data that computers may recognize. The data that may be recognized by the computer may include binary data, text data, etc.

The smart gas management platform 130 may use various feasible speech recognition technologies to convert the call message to the text message, for example, a mode based on a vocal tract model and a phonetic knowledge, a template matching mode (including a dynamic time warping, a vector quantization technology, etc.), a neural network mode (such as an artificial neural network (ANN)-based speech recognition system), etc.

In 320, determining a service category corresponding to the text message.

The service category refers to a category of the call message classified according to the gas business. For example, when the gas business includes one or more of the account opening, the payment, and the inquiry, correspondingly, the service category may also include one or more of the account opening, the payment, and the inquiry.

The smart gas management platform 130 may determine the service category corresponding to the text message through various feasible modes. In some embodiments, the smart gas management platform 130 may determine the service category corresponding to the text message according to a preset rule. The preset rule may include a keyword/keyword matching rule. For example, the smart gas management platform 130 matches the keyword in the text message with the keyword preset in the system of the smart gas management platform 130. When the keyword "account opening" is included in the text message, it may be determined that the service category corresponding to the text message includes the account opening. In some embodiments, the smart gas management platform 130 may determine the service category corresponding to the text message according to semantics. For example, when it is detected that the text message includes "the gas device at home fails", or "the gas meter light is off", a semantic recognition technology is applied to identify the real intention of the user including a report for repair, then it may be determined that the service category corresponding to the text message includes the report for repair. The semantic recognition technology refers to a technology of understanding the intention of the user based on the speech or the text, and may further be called a natural language understanding (NLU), or a natural language processing (NLP). The smart gas management platform 130 may use models based on the NLP including a hidden Markov model, or other modes to realize the semantic recognition.

In 330, determining, based on the service category, the feedback mode.

The smart gas management platform 130 may determine the feedback mode based on the service category in various feasible modes. In some embodiments, the smart gas management platform 130 may determine the feedback mode based on the service category according to the corresponding relationship between the service category and the feedback mode. For example, the corresponding relationship between the service category and the feedback mode may include that when the service category is the report for repair or the complaint, the corresponding feedback mode is the manual feedback, and when the service category is the inquiry or the payment, the corresponding feedback mode is the automatic feedback, etc.

Figure 4:
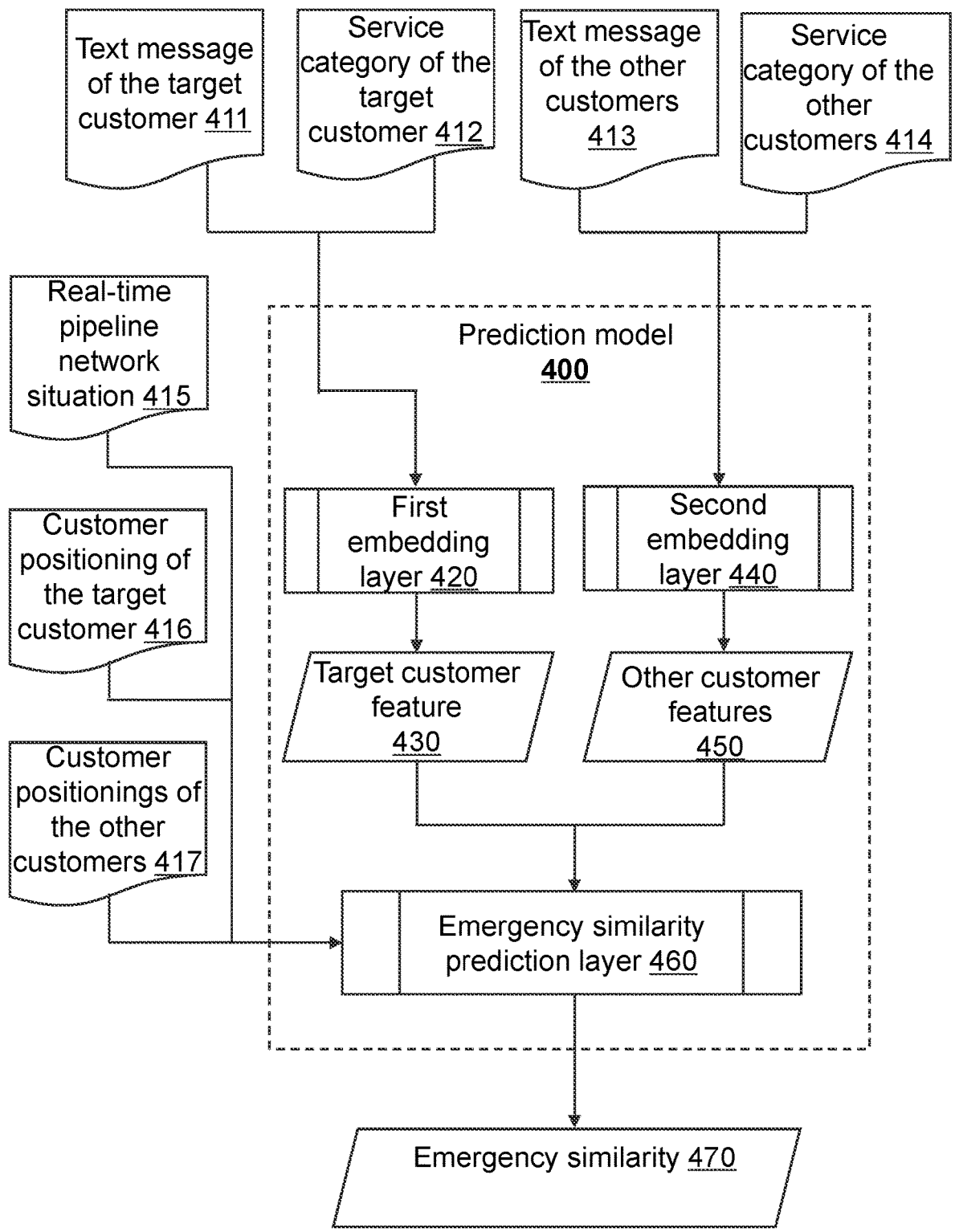
FIG. 4 is a schematic diagram illustrating an exemplary process for determining the feedback mode based on a prediction model according to some embodiments of the present disclosure.

For more content on the mode of determining the feedback mode based on the service category, please refer to FIG. 4 and the related description.

In some embodiments of the present disclosure, by converting the call message to the text message, determining the service category corresponding to the text message, and determining the feedback mode based on the service category, the determination of the feedback mode can be more automated and rationalized, and based on the above mode, a utilization rate of an information resource of the call center is improved, and manpower can be saved.

In some embodiments, the smart gas management platform 130 may determine, based on one or more of a service category of a message of other customers, a corresponding feedback mode of the other customers, and the service category of a message of the target customer, the feedback mode of the target customer through a preset algorithm. For example, the preset algorithm may include: establishing a training data set, a sample of the training data set including the service category of the message of the other customers and the corresponding feedback mode of the other customers, etc., finding N counts of messages of the customers with the shortest distance to the message of the target customer in the training data set, and If among the N counts of messages, the messages in a feedback mode A are the most, then the feedback mode of the target customer is A.

The distance refers to a vector distance between the message of the target customer and the message of the other customers. For example, the vector distance may include, but is not limited to, a cosine distance, a Euclidean distance, a Manhattan distance, a Mahalanobis distance, or a Minkowski distance.

In some embodiments, the distance may be related to a service category similarity. The service category similarity refers to a similarity of service categories of two samples (e.g., the message of other customers). The smart gas management platform 130 may obtain the service category similarity between two samples by calculating a service category vector distance between the two samples.

In some embodiments, the distance may be related to a real-time pipeline network situation and a customer positioning similarity. For example, the closer the real-time pipeline network situations of two samples is (e.g., the real-time pipeline network situations of the two samples are gas leakages), the smaller the distance between the two samples is. As another example, the higher the customer positioning similarity of two samples is, the smaller the distance between the two samples is.

The real-time pipeline network situation refers to a situation of the pipeline network in operation. The real-time pipeline network situation may include a real-time gas gate station reading, a real-time gas pressure value, whether the gas leakage occurs, etc. The real-time pipeline network situation may be obtained through a real-time monitoring of relevant data of the pipeline network.

The customer positioning refers to a position when the customer makes a call message. For example, the customer positioning may include a street or a neighborhood where the customer is located. The customer positioning may be obtained in various ways, for example, through the smart gas management platform 130 or a third-party platform (e.g., a positioning system, etc.).

The customer positioning similarity refers to a similarity between customer positionings of two samples. For example, if the pressure values of the gas pipes corresponding to the two samples are close, and the addresses of the two samples are close, then the similarity between the two samples is considered to be high. The smart gas management platform 130 may obtain the customer positioning similarity between two samples by calculating a customer positioning vector distance between the two samples.

In some embodiments, the distance may be related to an emergency similarity of the call message. For example, the higher the emergency similarity between two samples is, the smaller the distance between the two samples is.

The emergency similarity refers to a similarity of emergencies of the call messages between two samples.

In some embodiments, the emergency similarity may be predicted using a prediction model 400. As shown in FIG. 4, the prediction model 400 may include a first embedding layer 420, a second embedding layer 440, and an emergency similarity prediction layer 460. The prediction model 400 may be a machine learning model, such as any one or any combination of a recurrent neural network model, a convolutional neural network, or other customized model structures.

An input of the first embedding layer 420 includes a text message of the target customer 411 and a service category of the target customer 412, and an output includes a target customer feature 430.

An input of the second embedding layer 440 includes an text message of the other customers 413 and a service category of the other customers 414, and an output includes other customer features 450.

An input of the emergency similarity prediction layer 460 includes the target customer feature 430, the other customer features 450, a real-time pipeline network situation 415, a customer positioning of the target customer 416 and customer positionings of the other customers 417, and an output includes an emergency similarity 470.

In some embodiments, the prediction model 400 may be obtained through training. For example, the training samples are input to an initial prediction model, a loss function is established based on a label and an output result of the initial prediction model, and a parameter of the initial prediction model is updated. When the loss function of the initial prediction model satisfies a preset matching condition, the model training is completed. The preset matching condition may be that the loss function converges, a number of iterations reaches a threshold, etc. The label may be an actual emergency similarity of the samples. The label may be manually annotated.

In some embodiments of the present disclosure, the emergency similarity of the call message may be predicted reasonably by the prediction model 400, so that the call center can prioritize the urgent call message and improve the experience of the target customer.

In some embodiments, the smart gas management platform 130 may adjust weights of the service category similarity, the customer positioning similarity, and the emergency similarity 470. For example, when there is an abnormal emergency, the weights of the service category similarity, the customer positioning similarity, and the emergency similarity 470 may be increased.

In some embodiments, the smart gas management platform 130 may determine the feedback mode based on a historical service category, a historical feedback mode and a historical user rating. For example, if the feedback modes corresponding to historical payments of the customer are all automatic feedback and the historical user ratings are high, then the feedback mode of automatic feedback may be adopted for the customer at this time. As another example, if the rating of the automatic feedback of a historical repair request of the customer is lower than a preset rating, then the feedback mode of manual feedback may be adopted for the customer at this time.

In some embodiments, the smart gas management platform 130 may uniformly set the feedback mode based on one or more of the real-time pipeline network situation 415, the customer positioning, the service category, and a call time period. For example, when an anomaly occurs, many call messages may be received at the same time, and the automatic feedback may be unified to improve processing efficiency.

In some embodiments of the present disclosure, the feedback mode of the target customer is determined through the preset algorithm, so that the call center can reasonably allocate an answering of the call message, which alleviates a phenomenon that the call center is overloaded and the target customer waits for too long, and improves the experience of the target customer.

FIG. 5 is a schematic diagram illustrating an exemplary process for determining an operator according to some embodiments of the present disclosure. As shown in FIG. 5, the smart gas management platform 130 may determine a target operator 550 whose matching value with the target customer satisfies a preset condition from all the operators. The preset condition may be manually set. For example, the preset condition may include: the matching value with the target customer being the highest, the matching value with the target customer being greater than a preset threshold, etc.

The matching value refers to how well the operator matches the target customer. For example, the higher the matching value is, the more likely the operator is to solve the problem, and the higher a satisfaction of the target customer is.

In some embodiments, as shown in FIG. 5, the matching value is related to one or more of a service category of the call message 510, a historical answering record and service rating of the target customer 520, and a waiting time of the target customer 530. That is, the smart gas management platform 130 may determine a matching value 540 between the operator and the target customer based on the service category of the call message 510, the historical answering record and service rating of the target customer 520, and the waiting time of the target customer 530. For example, all operators include operator $A_1$, ..., operator AN (that is, a count of the operators is N), and correspondingly, the matching value 540 of the operator and the target customer includes a matching value $B_1$ (corresponding to operator $A_1$), ..., a matching value BN (corresponding to operator $A_N$). If there is a highest matching value (e.g., $B_1$), and the preset condition is to select an operator (e.g., operator $A_1$) corresponding to the highest matching value, the smart gas management platform 130 may determine the operator (e.g., operator $A_1$) as the target operator.

The matching value may be positively related to the service category corresponding to the call message. For example, if the service category corresponding to the call message of the target customer is not within a common processing range of operator $A_1$, the matching value between the target customer and operator $A_1$ is low.

The historical answering record refers to a record of the operator answering the message of the customer. The historical answering record may correspond to the service rating. For example, one historical call record corresponds to one service rating.

The matching value may be positively related to the historical service rating of the operator by the target customer. For example, the target customer has historical answering records with operator $A_2$ and operator $A_3$, and the service rating of the operator $A_2$ is higher than that of operator $A_3$, then the matching value of operator $A_2$ is higher than that of operator $A_3$.

The waiting time of the target customer refers to the time from when the target customer starts calling to when the operator answers.

The matching value is negatively related to the waiting time between the target customer and the operator. To make the call message of the target customer be answered by the operator as soon as possible, the smart gas management platform 130 may prioritize the allocation of an operator with a shorter waiting time for the target customer, that is, the shorter the waiting time between the target customer and the operator is, the higher the matching value of the operator is, and the easier it is for the call message of the target customer to be answered by the operator. On the contrary, the longer the waiting time between the target customer and the operator is, the lower the matching value of the operator is, and the harder it is for the call message of the target customer to be answered by the operator. For example, if the waiting time between the target customer and operator $A_4$ is 1 h, and the waiting time with operator $A_5$ is 2 h, then the matching value between the target customer and operator $A_4$ is higher than that with operator $A_5$.

The waiting time of the target customer may be predicted based on a queuing theory model. For example, the waiting times of different operators may be predicted based on an average call interval of the target customer, an average answer time, a count of operators, and a service range. For example, based on the queuing theory model, the waiting time of the target customer may be calculated through a mathematical modeling method.

In some embodiments, when there is no significant difference in the matching values among the operators, the operator with the closest distance to the customer may be preferentially matched. The no significant difference refers to that the difference between the matching values is smaller than a preset difference. For example, the matching values of operator $A_6$ and operator $A_7$ are 0.66 and 0.63, respectively, and the preset difference is 0.05, and the difference between the matching values between operator $A_6$ and operator $A_7$ (i.e., 0.03) is less than the preset difference (0.05), then it is regarded that there is no significant difference between operator $A_6$ and operator $A_7$. At this time, the distance between the target customer and operator $A_6$ and between the target customer and operator $A_7$ are calculated, and the operator with the smaller distance with the customer among operator $A_6$ and operator $A_7$ is determined as the target operator.

In some embodiments of the present disclosure, by preferentially matching the operator with the smaller distance to the customer, the operator may handle problems of the same or similar type, which improves the operator's proficiency in handling problems, thereby improving the efficiency of responding and improving the experience of the customer.

In some embodiments, the smart gas management platform 130 may determine a feedback content based on the service category corresponding to the call message. For example, the feedback content may be determined based on a knowledge map, a vector matching, or other modes. The feedback content may include a commonly push under the service category. For example, for the payment service, the smart gas management platform 130 may push content related to the payment, such as various payment modes, frequently asked questions about the payment, etc. For more content about the service category and the feedback content, please refer to the related description in FIG. 3.

FIG. 6 is a schematic diagram illustrating an exemplary process for determining a feedback content through a knowledge map according to some embodiments of the present disclosure. In some embodiments, as shown in FIG. 6, the smart gas management platform 130 may determine the feedback content through the knowledge map based on the service category corresponding to the call message.

The knowledge map refers to a map constructed based on the feedback content of multiple customers in the service category in an area. The knowledge map may represent a relationship between the customer and the feedback content in the area. In some embodiments, the management platform 130 may construct the knowledge map based on the customer, the service category, the feedback content, the area, etc. The knowledge map may include multiple nodes and edges.

The node includes one or more of the customer, the service category, the feedback content, or the area. As shown in FIG. 6, the nodes of a knowledge map 600 include area A node, area B node, area C node, and area D node, as well as service category a1 node, customer a2 node, feedback content a3 node, service category b1 node, customer b2 node, and service category c1 node.

A node feature includes a real-time pipeline network situation in a position area of the customer. For example, the customer positioning of node a2 may be a certain position in area A. As another example, the real-time pipeline network situation of the node B in the area may be busy or idle. For more content about the real-time pipeline network situation, please refer to the related description in FIG. 4.

The edges of the knowledge map may be formed by connecting nodes whose distance satisfies a preset distance threshold. As shown in FIG. 6, the edges of the knowledge map 600 includes a customer-service category edge generated by connecting the customer a2 node to the service category a1 node, a service category-feedback content edge generated by connecting the service category a1 node to the feedback content a3 node, a customer-feedback content edge generated by connecting the customer a2 node to the feedback content a3 node, a customer-area edge generated by connecting the customer a2 node to the area A node, etc.

In some embodiments, the smart gas management platform 130 may construct the knowledge map 600 based on the smart customer service management sub-platform and/or the smart gas data center to obtain relevant information of multiple call messages in the target area and data of a historical call message.

In some embodiments, the smart gas management platform 130 may select the feedback content satisfying a relevant condition from the knowledge map as the feedback content of the target customer. The relevant condition may include: taking the previous N pieces of feedback contents whose relevant degree with the service category is greater than a threshold and with the highest average rating of all customers as the feedback content of the target customer. The N may be manually preset, for example, the N may be 3.

In some embodiments of the present disclosure, through the knowledge map, determining the feedback content based on the service category corresponding to the call message helps to quickly obtain the feedback content for the target customer, so that the call center can automatically send the feedback content to the target customer, which improves an efficiency and accuracy of the call center when processing the call message.

In some embodiments, the smart gas management platform 130 may take the common feedback content of customers whose distance is less than the preset distance threshold (e.g., the content with the greatest count of feedbacks and whose rating is greater than the preset rating threshold, etc.) as the feedback content of the target customer, so that the feedback content may be richer and more representative, which helps to improve the customer experience. For more content about the distance, please refer to the related description in FIG. 4.

One or more embodiments of the present disclosure provide a device for managing a smart gas call center feedback, including a processor, and the processor is configured to execute any of the method for managing a smart gas call center feedback.

One or more embodiments of the present disclosure further provide a non-transitory computer-readable storage medium, the storage medium stores computer instructions, and when the computer reads the computer instructions in the storage medium, the computer executes the method for the smart gas call center feedback management in any one of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas call center feedback management, wherein the method is implemented based on a smart gas management platform, the method comprising:
receiving a call message of a target customer through a call center, and a content of the call message being related to a gas business;
converting the call message to a text message;
determining a service category corresponding to the text message; and
determining, based on the service category, the feedback mode; wherein the determining, based on the service category, the feedback mode comprises:
determining, based on one or more of a service category of a message of other customers, a feedback mode of the other customers, and a service category of a message of the target customer, the feedback mode of the target customer through a preset algorithm; wherein the preset algorithm comprises:
establishing a training data set, a sample of the training data set including the service category of the message of the other customers and the feedback mode of the other customers; finding N counts of messages of the customers with the shortest distance to the message of the target customer in the training data set, and if among the N counts of messages, the messages in a feedback mode A are the most, then the feedback mode of the target customer is A; wherein the distance is related to a service category similarity, a real-time pipeline network situation, a customer positioning similarity, and an emergency similarity of the call message, the emergency similarity being predicted using a prediction model, the prediction model being a machine learning model including a first embedding layer, a second embedding layer, and an emergency similarity prediction layer; wherein an input of the first embedding layer includes a text message of the target customer and a service category of the target customer, and an output includes a target customer feature;
an input of the second embedding layer includes a text message of the other customers and a service category of the other customers, and an output includes other customer features; and
an input of the emergency similarity prediction layer includes the target customer feature, the other customer features, a real-time pipeline network situation, a customer positioning of the target customer, and customer positionings of the other customers, and an output includes an emergency similarity;
in response to the feedback mode being manual feedback, determining a target operator through the call center to feed back a call of the target customer; and
in response to the feedback mode being automatic feedback, determining a feedback content through the call center and sending the feedback content to the target customer.

2. The method of claim 1, wherein the determining, based on the service category, the feedback mode further includes:
determining, based on a historical service category, a historical feedback mode, and a historical user rating, the feedback mode.

3. The method of claim 1, wherein the determining, based on the service category, the feedback mode further includes:
uniformly setting, based on one or more of a real-time pipeline network situation, a customer positioning, the service category, and a call time period, the feedback mode.

4. The method of claim 1, wherein the determining a target operator includes:
determining the target operator whose matching value with the target customer satisfies a preset condition from all operators.

5. The method of claim 4, wherein the matching value is related to one or more of a service category of the call message, a historical answering record and service rating of the target customer, and a waiting time of the target customer.

6. The method of claim 1, wherein the determining a feedback content includes:
determining, based on a service category of the call message, the feedback content.

7. An Internet of Things (IoT) system for smart gas call center feedback management, comprising a smart gas user platform, a smart gas service platform, a smart gas management platform, a smart gas sensor network platform, and a smart gas object platform, and the smart gas management platform being configured to:
receive a call message of a target customer through a call center, and a content of the call message being related to a gas business;
convert the call message to a text message;
determine a service category corresponding to the text message; and
determine, based on the service category, the feedback mode; wherein the determining, based on the service category, the feedback mode comprises:
determining, based on one or more of a service category of a message of other customers, a feedback mode of the other customers, and a service category of a message of the target customer, the feedback mode of the target customer through a preset algorithm; wherein the preset algorithm comprises:
establishing a training data set, a sample of the training data set including the service category of the message of the other customers and the feedback mode of the other customers; finding N counts of messages of the customers with the shortest distance to the message of the target customer in the training data set, and if among the N counts of messages, the messages in a feedback mode A are the most, then the feedback mode of the target customer is A; wherein the distance is related to a service category similarity, a real-time pipeline network situation, a customer positioning similarity, and an emergency similarity of the call message, the emergency similarity being predicted using a prediction model, the prediction model being a machine learning model including a first embedding layer, a second embedding layer, and an emergency similarity prediction layer; wherein an input of the first embedding layer includes a text message of the target customer and a service category of the target customer, and an output includes a target customer feature;

an input of the second embedding layer includes a text message of the other customers and a service category of the other customers, and an output includes other customer features; and an input of the emergency similarity prediction layer includes the target customer feature, the other customer features, a real-time pipeline network situation, a customer positioning of the target customer, and customer positionings of the other customers, and an output includes an emergency similarity in response to the feedback mode being manual feedback, determine a target operator through the call center to feedback a call of the target customer; and in response to the feedback mode being automatic feedback, determine a feedback content through the call center and send the feedback content to the target customer.

8. A non-transitory computer-readable storage medium storing computer instructions, wherein when reading the computer instructions in the storage medium, a computer implements the method for smart gas call center feedback management of claim 1.

* * * * *